United States Patent [19]

Wiggins

[11] Patent Number: 4,495,422
[45] Date of Patent: Jan. 22, 1985

[54] ILLUMINATION CONTROL FOR RASTER INPUT SCANNERS

[75] Inventor: Douglas G. Wiggins, Penfield, N.Y.
[73] Assignee: Xerox Corporation, Stamford, Conn.
[21] Appl. No.: 325,158
[22] Filed: Nov. 27, 1981
[51] Int. Cl.$^3$ .............................................. H04N 1/10
[52] U.S. Cl. ................................ 250/578; 250/237 R; 355/71; 358/293
[58] Field of Search ................... 250/578, 234–236, 250/216, 237 R; 355/71, 51, 68; 358/293, 294; 350/6.5–6.91

[56] References Cited

U.S. PATENT DOCUMENTS

| | | | |
|---|---|---|---|
| 3,967,894 | 7/1976 | Tsilibes | 355/4 |
| 4,090,788 | 5/1978 | Massengeil | 355/71 |
| 4,170,398 | 10/1979 | Koester | 350/6.8 |
| 4,288,821 | 9/1981 | Lavallee et al. | 358/293 |
| 4,321,630 | 3/1982 | Kramer | 358/293 X |
| 4,380,390 | 4/1983 | Tateoka et al. | 355/71 |

*Primary Examiner*—Edward P. Westin
*Attorney, Agent, or Firm*—Frederick E. McMullen

[57] ABSTRACT

A raster input scanner of the type having a linear array for scanning a relatively moving document line by line, there being lamp means to illuminate at least a line-like portion of the document and optical means to transmit image rays from the document to the array. To provide uniform illumination and obviate illumination degradation due to the effects of cosine 4th law, flare light, lamp fall-off, etc., an apertured mask is provided between the array and the document, the mask aperture uniformly changing in size from a minimum at the array center to a maximum at the array ends. To obviate system M.T.F. degradation, the height of the mask aperture is made less than the width of the array photosites.

3 Claims, 3 Drawing Figures

ILLUMINATION CONTROL FOR RASTER INPUT SCANNERS

The invention relates to raster input scanners, and more particularly to an improved illumination control for raster input scanners.

In raster input scanners, a linear array may be employed for scanning the image on a document original line by line. To provide the requisite illumination, one or more high intensity lamps are used together with an optical system, i.e. a lens, to transmit the image rays reflected from the document onto the array photosites. However, the illumination reaching the linear array photosites is normally not uniform due primarily to limitations inherent in the illumination components themselves, i.e. cosine 4th losses, flare light losses, illumination fall-off at the lamp ends, etc. As a result, illumination is normally found to be greater at the scanline center than at the scanline ends. While the aforedescribed illumination non-uniformities may be accommodated by electronically manipulating the image signals or pixels produced by the scanning array, electronic correction of this sort is expensive.

Additionally, the dimensional relationship of the photosites in present day arrays is such that the photosite dimension along the scan axis (i.e. the x-axis) is usually less than the dimension along the cross scan axis (i.e. the y-axis). As a result, image resolution in the scan direction is greater than image resolution in the cross scan direction with consequent degrading of the system Modulation Transfer Function (M.T.F.), particularly in the cross scan direction. This degradation typically shows up in an inability of the array to distinguish small horizontal lines on the document being scanned since in relation to the relatively large size of the photosite in the y direction, a horizontal line may form only a relatively small portion of the total area viewed by the photosite. As a result, a gray level signal is produced by the photosite which on subsequent processing and conversion to binary may be judged as a white or non-image area instead of a black image area.

The invention relates to a raster scanner for scanning an image bearing document one scanline at a time, comprising in combination: support means for supporting the document to be scanned; scan means for scanning the document on the support means including lamp means to illuminate at least one line of the document at a time, a linear array having a plurality of photosites for viewing the image line, and means for transmitting image rays comprising said illuminated line to the array; means to establish relative movement between the document and the scan means; and means for controlling the amount of light striking the array photosites to render said light substantially uniform across the line and offset illumination unbalance comprising a mask overlaying the array photosites and having an elongated continuous aperture therethrough to permit light to reach the array photosites, the aperture forming a uniformly increasing opening starting substantially at the array center to a maximum at the array ends.

IN THE DRAWINGS

Figure 1:
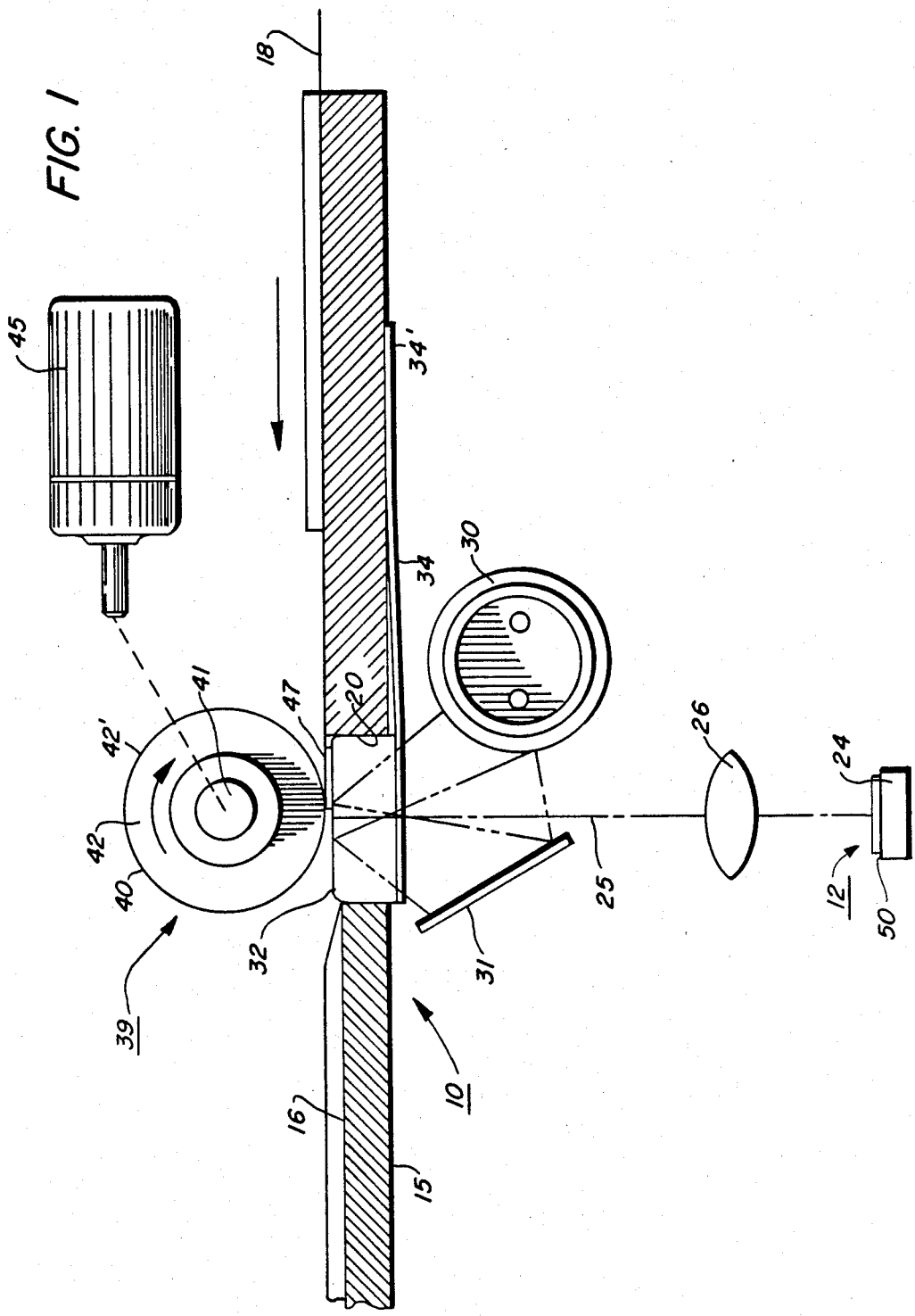
FIG. 1 is a schematic view of an exemplary raster scanner incorporating the array illumination control of the present invention.

Referring to the drawings, there is a shown an exemplary raster input scanner 10 incorporating the illumination control 12 of the present invention. Scanner 10 includes a surface forming means in the form of a document support member 15 having a relatively flat surface 16 across which documents 18 to be scanned are moved in the direction shown by the solid line arrow. A slit-like scanning aperture 20 is provided in the support member 15, the longitudinal axis of aperture 20 extending in the direction substantially perpendicular to the direction of movement of the document 18.

A suitable array 24 such as a Fairchild Corporation Model 121-H linear array is provided for scanning the document image line by line as the document passes across aperture 20. Array 24 is disposed so that the scanning axis thereof is substantially parallel to the axis of scanning aperture 20. The optical path between scanning aperture 20 and array 24 (designated by the numeral 25) includes a lens 26 for focusing the document images viewed by array 24 through aperture 20 onto the array 24. A lamp 30, disposed below the support member 15 and to one side of the optical path 25, illuminates the aperture area in the document image area thereover. To enhance illumination, a reflector 31 is disposed on the other side of the optical path 25 across from lamp 30, reflector 31 serving to reflect light emitted by lamp 30 into the aperture area.

A combination support-viewing element 32 which is formed from any suitable transparent material such as glass is movably disposed within the scanning aperture 20. Viewing element 32 is mounted on a pair of leaf springs 34. Springs 34, the longitudinal axis of which extends in a direction substantially parallel to the direction of movement of the document to be scanned to reduce perturbations in the document feed, have the remote ends 34' thereof secured as by cementing the underside of support member 15. As will be understood, leaf springs 34 bias viewing element 32 upwardly and into the confines of scanning aperture 20.

A document transport 39 has a document feed roll 40 rotatably mounted on suitable frame members (not shown) above scanning aperture 20 and the viewing element 32 therein, such that the periphery 42' of the roll 40 contacts the upper surface of viewing element 32 at a point just upstream of the optical path 25. A low friction surface 47 is preferably provided on viewing element 32 to control frictional forces between feed roll 40 and viewing element 32. As will be understood, feed roll 40 serves when actuated to move the document to be scanned along support member 15 and across the viewing element 32. Feed roll 40 comprises an internal core member or shaft 41, normally metal, having a rubber sleeve 42 thereabout. Sleeve 42 is preferably formed from a relatively hard durometer rubber material to assure uniform roll dimension and thus provide uniform feeding motion. A transport drive motor 45 is coupled to shaft 41 by suitable means (not shown), motor 45 rotating feed roll 40 in the direction shown by the solid line arrow upon energization of motor 45.

As will be understood, springs 34 hold viewing element 32 in resilient contact with the periphery of feed roll 40, roll 40 and viewing element 32 cooperating to form a nip between which the document 18 to be scanned passes. The bias provided by springs 34 permits transport 12 to accommodate documents of varying thickness without velocity changes.

Figure 2:
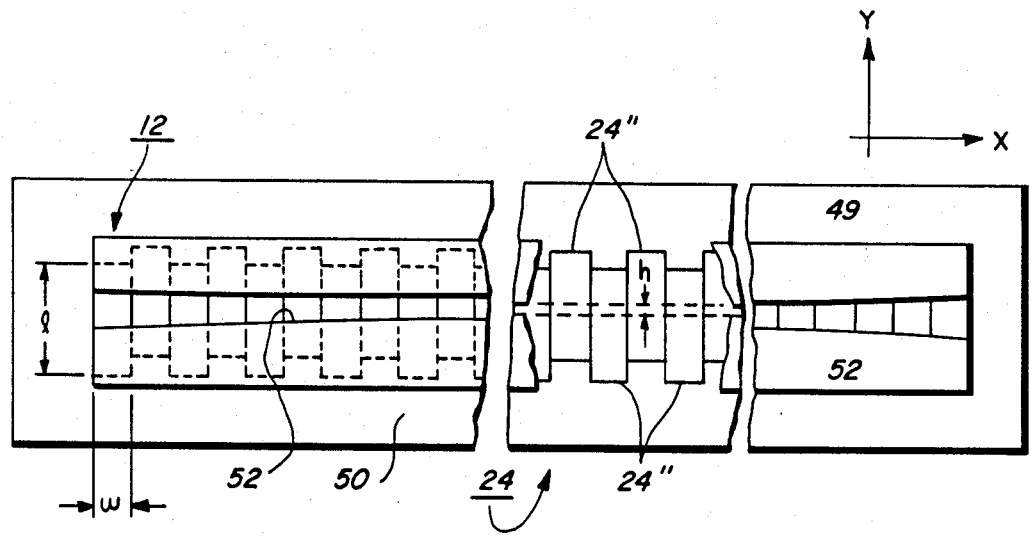
FIG. 2 is an enlarged top plan view showing details of the array illumination control of the present invention.

Referring particularly to FIG. 2, photosites 24' of array 24 are normally formed in offset staggered fashion with the length dimension 1 of the individual photosites 24 being greater than the photosite width w, the excess photosite length forming a well 24" at the photosite end. As a result, array resolution along the scan axis (i.e. along the x axis) is normally greater than array resolution in the cross scan direction (i.e. along the y axis) with the result that the presence of relatively fine horizontal lines on the image being scanned may go undetected.

To accommodate both illumination vagaries due to the inherent characteristics of lamp 30, cosine 4th losses, flare light loss, lamp end fall-off, and the like, illumination control 12 is provided in the optical path 25 between scanning array 24 and lens 26. In a preferred embodiment, illumination control 12 comprises an apertured metal light shield or mask 49 formed as by electrodeposition of a suitable metal such as aluminum directly on the upper face 50 of array 24. Mask 49 has an elongated opening or aperture 52 therein extending across the operating length of the array 24 to control the effective size of the viewing window of each array photosite 24' and hence the amount of light admitted to the individual photosites 24' of array 24 and the image area viewed by each photosite. The size of aperture 52 in mask 49 changes uniformly along the length of aperture 52 from a minimum adjacent the array center to a maximum at the array ends.

To enhance the M.T.F. of the array 24, the dimensional relationship of aperture 52 relative to the size of the photosites 24' is determined by the following relationship:

$$h \leq w$$

where h is the effective aperture height at each photosite taken along the y axis and w is the effective photosite width taken along the x axis. As a result of the above relationship, the window or opening formed by aperture 52 in mask 49 at each photosite is normally undersquare, i.e. the height h is less than the width w, and in no event oversquare, (i.e. the height h greater than the width w) thereby providing enhanced resolution in the cross scan direction while avoiding or at least reducing the need to employ relatively expensive corrective electronics.

Figure 3:
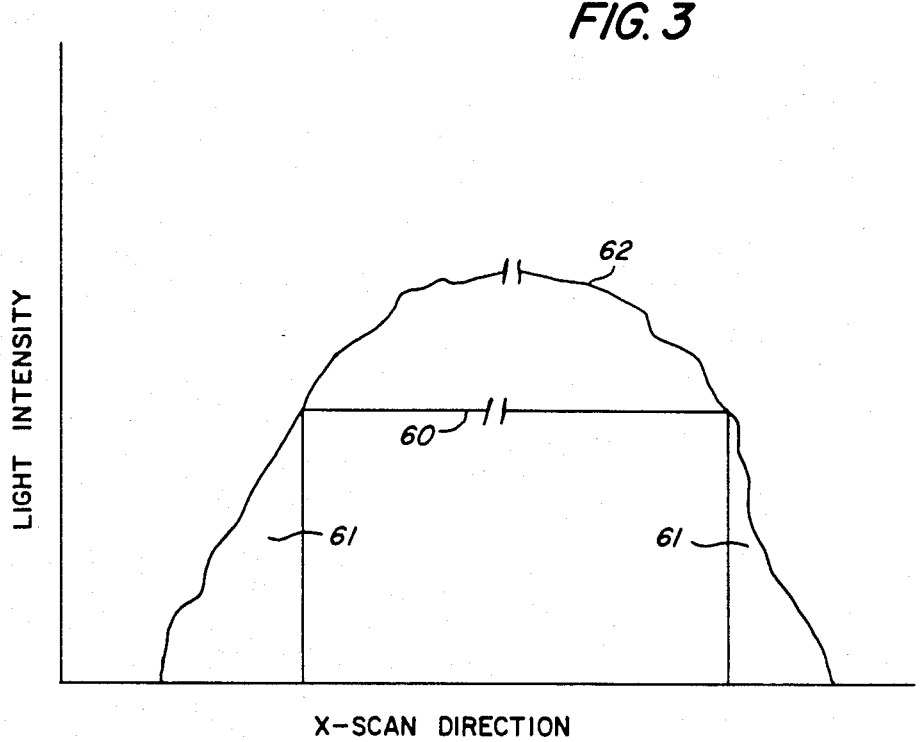
FIG. 3 is a graphical representation of illumination profile before and after application of the illumination control of the present invention.

Referring particularly to FIG. 3 of the drawings, the curve 62 shown therein illustrates a typical illumination profile for a raster input scanner of the type described herein before correction by the illumination control of the present invention. The areas identified by the numeral 61 represent that portion of the total illumination which extends beyond the ends of the viewing area of array 24 (i.e. beyond the side edges of the document 18 being scanned) which as will be understood are not considered critical to the illumination of the image line. The relatively flat, substantially uniform illumination level achieved by illumination control 12 is exemplified by curve 60 and demonstrates the effectiveness of the illumination control 12 in offsetting and correcting for inherent non-uniformities in the scanner illumination system components such as lamp 30. At the same time, M.T.F. degradation in the axis perpendicular to that of the array photosites 24' is obviated by assuring an effective viewing window for each photosite 24' along the x axis that is undersquare or no more than square.

While the invention has been described with reference to the structure disclosed, it is not confined to the details set forth but is intended to cover such modifications or changes as may come within the scope of the following claims.

I claim:

1. In a raster scanner for scanning an image bearing document one scanline at a time, the combination of:
    (a) support means for supporting the document to be scanned;
    (b) scan means for scanning said document scan line by line including
        (1) lamp means for illuminating at least one line of said document,
        (2) a linear array having a plurality of photosites for scanning said image line arranged in side by side relation along a first scanning axis, and
        (3) means for transmitting image rays comprising said illuminated line to said array;
    (c) means for establishing relative motion between said document and said scan means along a second scanning axis substantially perpendicular to said first scanning axis, the dimension of said photosites along said second scanning axis being greater than the dimension of said photosites along said first scanning axis whereby resolution of said array along said second scanning axis is ordinarily less than resolution of said array along said first scanning axis; and
    (d) means for controlling the dimension of said photosites along said second scanning axis and the amount of light striking said array photosites to enhance resolution of said array along said second scanning axis and offset illumination unbalance, comprising a mask overlaying said array photosites, said mask having an elongated continuous aperture therethrough extending along said first scanning axis to permit light to reach said array photosites, the dimension of said aperture along said second scanning axis uniformly increasing from substantially said aperture center to a maximum at said array ends, the maximum dimension of said aperture along said second scanning axis being less than the dimension of said photosites along said second scanning axis.

2. In combination:
    a linear array for viewing images line by line, said array having a plurality of photosites which view successive portions of each image line along a scan axis, relative movement between said images and said array along a cross scan axis substantially perpendicular to said scan axis permitting said array photosites to view said image lines in succession; the dimension of the individual photosites that comprise said array along said cross scan axis being greater than the dimension of said photosites along said scan axis whereby resolution along the scan axis is ordinarily greater than resolution along the cross scan axis; and
    means for reducing the effective size of said photosites to enhance resolution of said array along said cross scan axis comprising a mask integral with said array and overlaying said array photosites, said mask having an elongated continuous aperture therethrough paralleling the scan axis and forming a viewing window through which said array photosites view said image lines, the dimension of said aperture along said cross scan axis uniformly increasing from a minimum at substantially said array center to a maximum at said array ends, said aperture maximum dimension being less than the dimension of said array photosites along said scan axis whereby to convert the effective size of said photosites from oversquare to undersquare.

3. The scanner according to claim 1 in which said mask is formed by electro-deposition on said array.

* * * * *